(12) United States Patent
Deilmann et al.

(10) Patent No.: US 10,415,841 B2
(45) Date of Patent: Sep. 17, 2019

(54) METHOD AND CONTROL APPARATUS FOR SWITCHING A NIGHT MODE OF A HEATING SYSTEM AND/OR AN AIR-CONDITIONING SYSTEM ON AND OFF

(71) Applicant: TADO GMBH, Munich (DE)

(72) Inventors: Christian Deilmann, Munich (DE); Johannes Schwarz, Munich (DE)

(73) Assignee: TADO GMBH, Munich (DE)

( * ) Notice: Subject to any disclaimer, the term of this patent is extended or adjusted under 35 U.S.C. 154(b) by 644 days.

(21) Appl. No.: 14/766,489

(22) PCT Filed: Feb. 9, 2014

(86) PCT No.: PCT/EP2014/000351
§ 371 (c)(1),
(2) Date: Aug. 7, 2015

(87) PCT Pub. No.: WO2014/121947
PCT Pub. Date: Aug. 14, 2014

(65) Prior Publication Data
US 2015/0369509 A1 Dec. 24, 2015

(30) Foreign Application Priority Data
Feb. 10, 2013 (DE) .......... 10 2013 002 430

(51) Int. Cl.
*F24F 11/30* (2018.01)
*H04L 29/08* (2006.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC .............. H04L 12/2816; H04L 67/125; H04L 12/2827; F24F 11/006; F24F 2011/0069;
(Continued)

(56) References Cited

U.S. PATENT DOCUMENTS 6,066,843 A * 5/2000 Scheremeta ......... F24F 11/0034
236/91 C
9,094,539 B1 * 7/2015 Noble .................. H04N 7/00
(Continued)

FOREIGN PATENT DOCUMENTS

WO 2012068517 A1 5/2012

OTHER PUBLICATIONS

PCT/EP2014/000351, International Search Report, dated Aug. 1, 2014, 3 pages.
(Continued)

*Primary Examiner* — Brian W Wathen
*Assistant Examiner* — Mohammed Shafayet
(74) *Attorney, Agent, or Firm* — Hoffman Warnick LLC

(57) ABSTRACT

The invention relates to a method for switching on and off a night mode of a heating and/or air conditioning system, wherein an energy consumption of the heating and/or air conditioning system is reduced when the night mode is switched on and increased when the night mode is switched off. It is provided according to the invention that with a smartphone an activity of a user of the smartphone is detected, that with program code an activity state of the user is inferred when an activity is noticed and a state of rest of the user is inferred in the absence of activity, wherein the program code is stored in a non-volatile data memory, and that electronic control means switch on or off the night mode as a function of whether a state of rest or an activity state of the user has been noticed. The invention also relates to a corresponding control apparatus.

12 Claims, 1 Drawing Sheet

(51) Int. Cl.
*H04L 12/28* (2006.01)
*H04M 1/725* (2006.01)
*G05B 15/02* (2006.01)
*F24F 11/62* (2018.01)
*H04W 4/00* (2018.01)
*F24F 11/57* (2018.01)
*F24F 11/58* (2018.01)

(52) U.S. Cl.
CPC ...... *H04L 12/2816* (2013.01); *H04L 12/2827* (2013.01); *H04L 67/125* (2013.01); *H04M 1/72533* (2013.01); *F24F 11/57* (2018.01); *F24F 11/58* (2018.01); *G05B 2219/2614* (2013.01); *H04W 4/00* (2013.01); *Y04S 40/18* (2018.05)

(58) Field of Classification Search
CPC .... F24F 2011/0071; G05B 2219/2614; H04W 4/00
USPC .......................................... 700/276
See application file for complete search history.

(56) References Cited

U.S. PATENT DOCUMENTS

| | | | | |
|---|---|---|---|---|
| 9,441,847 | B2* | 9/2016 | Grohman | G05B 15/02 |
| 2006/0053315 | A1* | 3/2006 | Menzl | G06F 1/3203 713/300 |
| 2007/0188323 | A1* | 8/2007 | Sinclair | G06F 21/445 340/568.1 |
| 2008/0008313 | A1 | 1/2008 | Fyke | |
| 2009/0111528 | A1* | 4/2009 | Kovalenko | H04M 1/72519 455/569.1 |
| 2009/0140059 | A1* | 6/2009 | Barton | F24F 11/0012 236/51 |
| 2009/0192556 | A1 | 7/2009 | Wu et al. | |
| 2010/0013778 | A1 | 1/2010 | Liu et al. | |
| 2010/0261465 | A1* | 10/2010 | Rhoads | G08C 17/00 455/420 |
| 2010/0297967 | A1* | 11/2010 | Fujii | H04W 52/0254 455/127.1 |
| 2011/0046805 | A1* | 2/2011 | Bedros | H04L 12/2809 700/291 |
| 2011/0063138 | A1 | 3/2011 | Berkobin et al. | |
| 2011/0134061 | A1* | 6/2011 | Lim | G06F 3/016 345/173 |
| 2011/0290893 | A1* | 12/2011 | Steinberg | F24F 11/0034 236/49.3 |
| 2012/0031984 | A1 | 2/2012 | Feldmeier et al. | |
| 2012/0071149 | A1* | 3/2012 | Bandyopadhyay | G06F 1/1643 455/418 |
| 2012/0172027 | A1* | 7/2012 | Partheesh | H04W 4/021 455/420 |
| 2012/0185717 | A1* | 7/2012 | Song | H04W 52/0251 713/323 |
| 2012/0221151 | A1 | 8/2012 | Steinberg | |
| 2012/0290138 | A1 | 11/2012 | DiFulgentiz | |
| 2013/0184876 | A1 | 7/2013 | Roshen et al. | |
| 2014/0022223 | A1* | 1/2014 | Jung | G09G 5/10 345/207 |
| 2014/0031989 | A1* | 1/2014 | Bergman | F24F 11/30 700/276 |
| 2014/0045482 | A1* | 2/2014 | Bisson | H04W 4/021 455/420 |
| 2014/0206327 | A1* | 7/2014 | Ziemianska | G06F 3/011 455/418 |
| 2014/0207292 | A1* | 7/2014 | Ramagem | G05B 15/02 700/278 |

OTHER PUBLICATIONS

E1a: Article from the tado website dated Dec. 10, 2015, 4 pages.
E1b: "Meet Till—one lucky beta user" Article from tado website dated Dec. 10, 2015, 13 pages.
E1c: article from the tado website dated Nov. 14, 2012: The tado device reduces heating power during night hours and when nobody is at home, 4 pages.
E1d: tado manual (publication date unknown): the tado device automatically adjusts a heating device to the daily routine of a user, 2 pages.
E1e: news article from the tado website dated Nov. 14, 2012: The tado device reduces the heating power when everybody has left the house. Also weather forecast is used for adjusting the control mechanism, 2 pages.
E1f: technical documentation of a product by tado (publication date unknown): The Tado° Smart Thermostat controls a heating system depending on sensor data concerning temperature, humidity and light intensity. Controlling the Tado° Smart Thermostat is possible through a smartphone, 14 pages.
E8—Part 1: Mark Christopher Feldmeier, "Personalized Building Comfort Control," Massachusetts Institute of Technology, 2009, 64 pages.
E8—Part 2: Mark Christopher Feldmeier, "Personalized Building Comfort Control," Massachusetts Institute of Technology, 2009, 216 pages.

\* cited by examiner

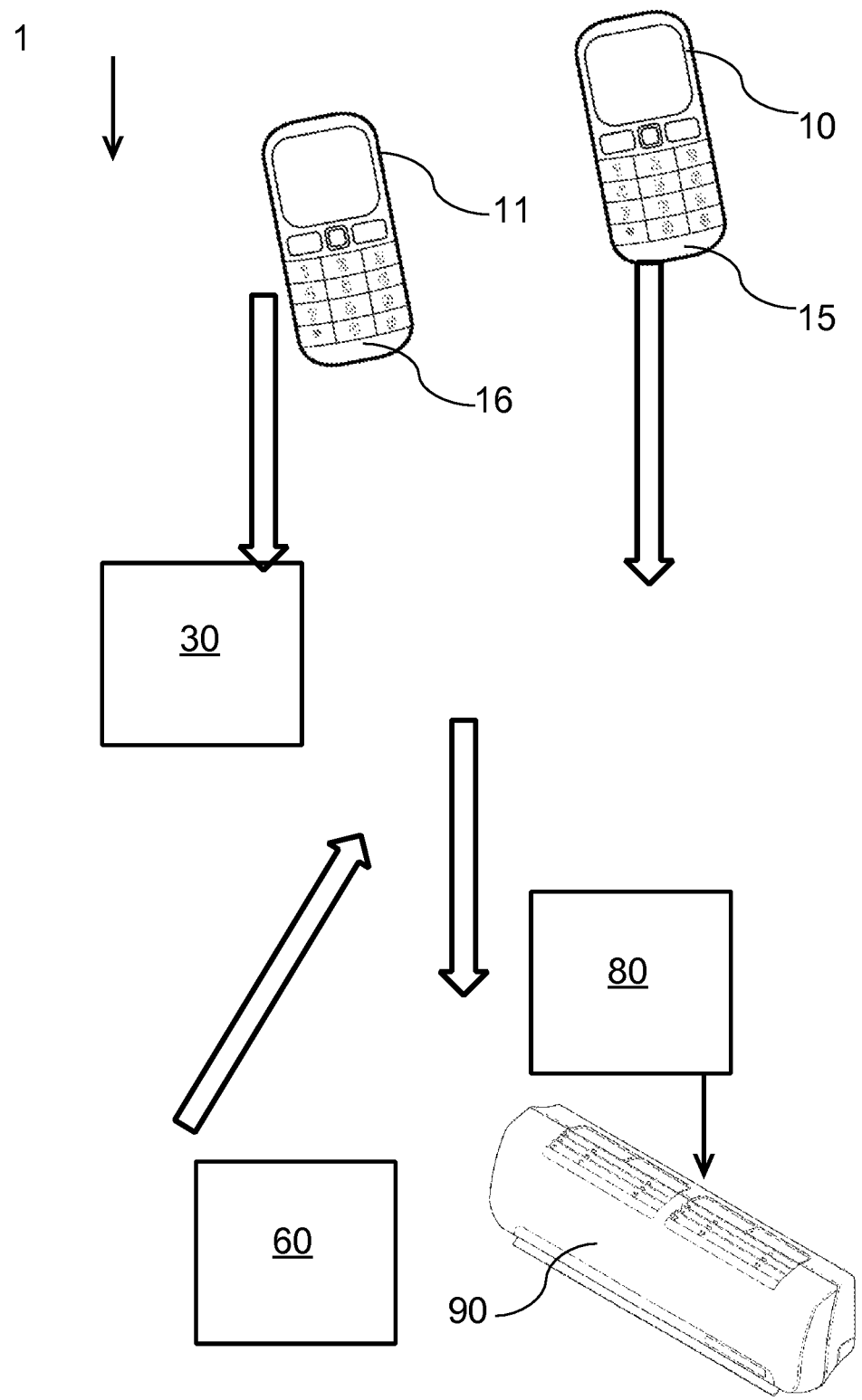

METHOD AND CONTROL APPARATUS FOR SWITCHING A NIGHT MODE OF A HEATING SYSTEM AND/OR AN AIR-CONDITIONING SYSTEM ON AND OFF

TECHNICAL FIELD

The present invention relates to a method and a control apparatus for switching on and off a night mode of a heating and/or air conditioning system.

BACKGROUND OF THE INVENTION

A heating and/or air conditioning system is intended to heat or cool a room, in which the system is located, and/or one or more further rooms.

In order to avoid superfluous energy costs, in the case of a heating system a reference temperature, to which the heating system heats an environment, should not be unnecessarily high. Similarly, an air conditioning system should not cool an environment to an unnecessary extent.

Many people regard as sufficient for a sleep phase a lower room temperature and thus a lower heating output of a heating system. For example the room temperature can be decreased by 1° C. to 5° C. during sleep. To reduce the costs of an air conditioning system, a higher room temperature can also be accepted during sleep. In known methods and control apparatuses a night mode is therefore set at night.

When the night mode is switched on in a generic method an energy consumption of the heating and/or air conditioning system, i.e. a heating or cooling output, is reduced, and when the night mode is switched off it is increased. The night mode can therefore also be described as an energy saving mode.

In a generic control apparatus for switching on and off a night mode of a heating and/or air conditioning system, a setting device is provided which can be connected to the heating and/or air conditioning system in order to change the heating and/or cooling output of the heating and/or air conditioning system. An energy consumption of the heating and/or air conditioning system is thereby reduced when the night mode is switched on and increased when the night mode is switched off.

Outside of the night mode, i.e. in a day mode, the energy consumption can be constant or variable. In particular, the day mode can additionally be interrupted by further phases, in which the energy requirement can be even lower than in the night mode. This may be desirable if nobody is present for many hours in the rooms to be heated or cooled.

It is known to set a night mode according to a time schedule as a function of clock time. It is hereby possible to achieve a certain concordance with actual sleep phases of a person. Typically, however, clock times, at which persons go to sleep and get up again, are variable. If a person remains awake for longer than usual, a heating or cooling output of the heating and/or air conditioning system is turned down too early in the case of a fixed time schedule. A room temperature is thereby set to an undesired value. If a person goes to bed earlier than usual, a fixed time schedule leads to an unnecessarily high heating or cooling output. Correspondingly, ending of the night mode according to a fixed time schedule leads to unnecessarily high heating or cooling outputs, which are associated with considerable costs, or to room temperatures that are considered to be unpleasant.

OBJECT OF THE INVENTION

It can be regarded as the object of the invention to provide a method and a control apparatus to switch on and off a night mode of a heating and/or air conditioning system, of which the switching times are adapted as precisely as possible to the behaviour of a user.

DESCRIPTION OF THE INVENTION

This object is achieved by the method and by the control apparatus disclosed.

The aforementioned method for switching on and off a night mode of a heating and/or air conditioning system is characterised according to the invention in that an activity of a user of a smartphone is detected with this smartphone, that with program code an activity state of the user is inferred upon ascertaining an activity and a state of rest of the user is inferred in the absence of activity, whereby the program code is stored in a non-volatile data memory, and electronic control means switch on or off the night mode as a function of whether a state of rest or an activity state of the user has been noticed.

In the control apparatus described above for switching on and off a night mode of a heating and/or air conditioning system it is provided according to the invention that a non-volatile data memory with program code that can be run by a smartphone is provided. The program code is designed, when it is run on the smartphone, to detect an activity of a user of the smartphone, to infer an activity state of the user if an activity is noticed, to infer a state of rest of the user in the absence of activity, and to send information concerning whether a state of rest or an activity state has been noticed, in particular via a radio connection to electronic control means. These electronic control means are designed, as a function of the information, to send an instruction to change the heating and/or cooling output to the setting device in order to switch on or off the night mode. The setting device has data transmission means to receive an instruction of the electronic control means.

It can be regarded as an idea of the invention to control the heating and/or cooling output as a function of an activity of a user and to detect this activity with a smartphone. It has been recognised that smartphones are particularly suited for this purpose, because persons or users often carry a smartphone directly with them for a large part of the day. To ascertain a user activity, smartphones are thus superior to measuring devices that a user does not typically carry with him throughout the day. In addition smartphones offer the significant advantage that hardware is already present for wireless transmission of information concerning a user activity.

It can be regarded as an advantage that a user does not have to input a control instruction to switch on or off a night mode himself. Instead a suitable time for such a control instruction is determined by the program code and the electronic control means and at this time a control instruction is output to a setting device which controls the heating and/or air conditioning system.

An idea can further be seen in that a user does not have to carry out any measures whatsoever for a change to the night mode. Instead the night mode is switched on as a function of whether an absence of activity is noticed.

Clock times of the switching on and off of a night mode can be set particularly flexibly by the invention. If a user goes to bed earlier or later than usual, an absence of activity is recorded correspondingly earlier or later. A clock time to switch on the night mode can thus be variably set without a user having to issue any switching commands to the heating and/or air conditioning system.

A particularly high energy efficiency can thus be achieved. Unnecessary heating or cooling phases can be avoided. At the same time a situation in which a user has to put up with a temperature perceived as unpleasant can be extensively avoided.

The control apparatus of the invention has, as a component, program code or program code means, which can in particular be run on a smartphone. The program code is stored in a non-volatile data memory. This can be the internal memory of a smartphone or a changeable memory card for a smartphone. A data memory which cannot be connected to the smartphone without accessories is also possible. The functions of the program code described in more detail below can be achieved on the one hand completely on the smartphone. Alternatively, the program code can be designed to interact via a radio connection of the smartphone with external program code or another computing device, for example a server. The functions, described here, of the program code are then achieved jointly by the program code of the smartphone and the external program code. The program code can also be designed, in particular when the program code is first run, to load and store further program code via a data connection of the smartphone, whereby the described functions of the program code can only be achieved together with the further program code.

A portable, in particular a hand-held, electronic device that can carry out data transmission via radio communication, in particular being able to establish an internet connection, can be regarded as a smartphone. The smartphone can be a mobile phone, preferably with internet capability.

The electronic control means, with which an instruction to change the heating and/or cooling output can be output to the setting device of the heating and/or air conditioning system, can in principle be of any type and be present at any location.

The electronic control means are preferably a part of a server system, with which the information signals of many smartphones can be processed and instructions output to numerous setting devices. In principle, as many heating and/or air conditioning systems as desired can advantageously hereby be controlled with software on a single server system. Updating or improving the software thus automatically affects all heating and/or air conditioning systems to be controlled. In addition data concerning numerous users can hereby be stored with the software of the server system and be used to fix decision-making rules concerning under which conditions the night mode is to be switched on or off if an activity or absence of activity of the user is noticed.

Alternatively, the control means can, however, also be designed as a computer program which can be run by the smartphone. In this case the smartphone itself sends an instruction to change the heating and/or cooling output to the setting device.

The data transmission means of the setting device can in principle be of any type and preferably facilitate an internet connection. For this, the data transmission means can have radio means, with which an internet connection can be established directly and/or via a local network. In principle, a cable connection to a device with internet capability or directly to the control means can also be provided.

An activity can be understood to be any act of a user that can be noticed by a smartphone. This can also be interpreted to include further environment changes that can be noticed by the smartphone and which are not caused by the user himself.

To check an activity of the user, one or more of the following checking measures may be carried out: detect a movement of the smartphone with an acceleration sensor of the smartphone; detect an environment brightness with a light sensor of the smartphone or with a solar cell located on the smartphone for power generation; detect an environment noise volume with a microphone of the smartphone; detect an activation of a loud speaker of the smartphone; detect an environment temperature with a temperature sensor of the smartphone; detect the battery consumption of the smartphone; detect whether the screen of the smartphone is switched on; detect the pressing of a key in the case of a mechanical key or on a touchsensitive surface of the smartphone, in particular on a touch-sensitive screen; detect establishment or disconnection of a connection between the smartphone and a power source or an external device.

Hardware that is already present on standard smartphones can be used for these checking measures. It may thereby be significant that the user does not have to carry out any activities which themselves relate to controlling the heating and/or air conditioning system. A use of the smartphone, for example the activation of buttons or programs, can already be detected as activity. Particular advantages may be offered by the acceleration sensor. In this case an activity can be noticed, for example walking or other movement of the user, without the user actively using the smartphone.

An activity state can be inferred precisely when at least one of the following conditions is fulfilled: the smartphone is moved for a time period exceeding a predefined threshold duration; the environment brightness of the smartphone is above a predefined threshold brightness for a predefined time period; the environment volume of the smartphone lies above a predefined threshold volume for a predefined time period; a loud speaker of the smartphone generates acoustic signals at least for a predefined duration; the battery consumption is above a threshold value within a certain time period; an establishment or disconnection of a connection between the smartphone and a power source is noticed; an environment temperature lies above a predefined threshold temperature. The environment temperature of a smartphone depends upon whether it is carried or worn on the body of the user. If the threshold temperature is exceeded it can be inferred that the smartphone is carried or worn on the body. Consequently the activity state is assumed.

A particularly low error frequency when ascertaining an activity state can be achieved if a plurality of the aforementioned conditions must be fulfilled for an activity state to be noticed. Alternatively or additionally, a threshold duration can be predefined for each of these conditions which must be exceeded for an activity state to be noticed. It can thereby be necessary for the threshold duration to be reached without interruption, i.e. "in one go", or to be reached with possible interruptions. The environment volume is usually subject to greater fluctuations and only rarely exceeds uninterrupted a predefined threshold duration.

These measures avoid ascertaining of an activity state while a user is sleeping or is only active for a short time at night and then goes to sleep again. If a user for example takes his smartphone in his hand for a short time when he wakes up at night in order to look at the clock time, a movement of the smartphone, the pressing of a key, a screen switch-on and/or an increased energy consumption through the screen switch-on are recorded. Nevertheless, a false determination of an activity state can be avoided, in particular by the threshold durations.

It can be provided for an evaluation of the battery consumption that only the battery consumption by certain components of the smartphone is detected, for example of the screen. A battery consumption for a radio transmission, in particular for an internet connection, can be excluded. Program updates are often carried out automatically and thus also at night. By excluding such battery consumption, an activity of the user will not be wrongly inferred.

It can be provided that a state of rest of the user is inferred if no activity has been noticed for a predefined time period.

In addition it can be provided that the state of rest of the user is inferred if the smartphone is switched off and/or a certain profile setting of the smartphone is selected. These measures are meaningful if a user normally switches off or changes the profile setting of the smartphone before going to sleep. Profile settings are to be understood to be selectable groups of settings. These can include in particular the volume of the ringtone for incoming calls and SMS and also the setting whether a vibration alarm is activated for incoming calls and SMS. Alternatively or additionally, a profile setting can include a setting whether a radio connection to a telephone and/or internet provider is established. This is referred to as "flight mode" setting in the operating system Android™ of Google Inc.

In variants of the method according to the invention and the control apparatus according to the invention, decision-making rules concerning when a state of rest is inferred and when the night mode is switched on and off can be changed as a function of collected information concerning activities of the user. If it is noticed for example that a user always selects a certain profile setting and shortly thereafter, with the decision-making rules to date, the night mode is set, the decision-making rules to date can be supplemented in that the night mode is set if this profile setting is selected.

As an additional condition which must be fulfilled to infer the state of rest or to set the night mode, it can be provided that a current clock time must lie within a predefined time interval. The predefined time interval can be fixed differently for different days of the week. It can for example be avoided that there is a switch to the night mode if a user leaves his smartphone at home during the day but continues to be active.

In order to avoid errors if a user does not have his smartphone on his person, at least one of the following additional measures can also be carried out: a room brightness in a room to be temperature-controlled by the heating and/or air conditioning system is measured; a room volume in a room to be temperature-controlled by the heating and/or air conditioning system is measured; a movement of a user is detected with a movement sensor in a different room from the bedroom; a use of a computer which is located in a room to be temperature-controlled by the heating and/or air conditioning system is noticed; and an email or internet use by the user is noticed. These additional measures can be carried out with one or more stationary sensors which can be provided in particular in a fixed position in a room to be temperature-controlled with the heating and/or air conditioning system. An activity state can then be inferred if the room brightness exceeds a predefined threshold, in particular for a predefined time period, if the room volume exceeds a predefined threshold, in particular for a predefined time period, if a movement in a room other than the bedroom, in particular over at least a predefined time period, is detected, if a computer use is noticed or if an email or internet use by the user is noticed.

In principle the night mode should only be set when a user is also actually within the rooms which are to be temperature-controlled by the heating and/or air conditioning system and lies down to sleep there.

If a further movement sensor is arranged in the bedroom a distinction can be made between a period spent by the user in a bedroom or in another room in the same building. For this, in principle, other stationary sensors can also be installed both in the bedroom and also in other rooms. It can be provided to switch on the night mode only when as an additional precondition a presence of the user in the bedroom was last noticed with the stationary sensors.

If the user remains outside of the rooms to be temperature-controlled and if a state of rest is noticed, for example because the smartphone remains motionless for a fairly long period in a rucksack, the night mode is not to be set. It can thus be provided that the location of the smartphone is detected with the smartphone, that a distance between the location of the smartphone and the location of the heating and/or air conditioning system or a bedroom is determined and that the night mode is only set when the distance is less than a tolerance distance. The tolerance distance can be selected as a function of the precision of the location determination.

The smartphone can determine its position with different measures. The currently available possibility that brings with it the lowest energy requirement can be selected. For example the smartphone can select between positioning based on GPS, the reception of a known WLAN network or a triangulation method, which uses received signals from mobile phone masts of a mobile phone operator.

It can thus be detected whether the user is in the area of a building, in which the heating and/or air conditioning system is installed. In the case of a high precision of the location determination it is also possible to distinguish between a period spent by a user in the bedroom and in another room. For this, in principle, any desired indoor positioning methods can be used. A signal reception of the smartphone from a WLAN or WiFi network may be used. As a function of a signal strength and/or a signal transit time it is possible to distinguish between periods spent in different rooms. For this, a comparison with a reference value of a signal strength and/or a signal transit time can be used during a period spent in the bedroom. The reference value can have been previously stored. It can also have been automatically detected and stored for the location, at which the user remains, if the night mode has been set with the method according to the invention.

For the energy saving operation of the smartphone it can further be provided that activity of a user is only checked when the distance of the smartphone from the location of the heating and/or air conditioning system or from the bedroom is shorter than the tolerance distance. The fact that a checking of the activity is dependent upon the location of the smartphone can also be limited to certain checking measures. Some checking measures increase the energy requirement of the smartphone considerably, for example the use of the acceleration sensor. These checking measures can be carried out as a function of location. Other checking measures hardly increase or do not increase the energy requirement at all. This can apply to the checking measures whether the screen is switched on and whether a connection is established or disconnected between the smartphone and a power source. Such checking measures can also be carried out independently of the location.

Alternatively or additionally, it can also be provided that all or some of the aforementioned additional measures are only to be carried out when the distance of the smartphone from the heating and/or air conditioning system or from a bedroom to be temperature-controlled is shorter than a tolerance distance. If these additional measures are carried out with battery operated devices the battery life can also be extended here by avoiding unnecessary checking of a user activity.

A night mode can thus always be set when either a state of rest of a user is noticed or when additionally further conditions are fulfilled, for example in relation to the location of the smartphone or the current clock time.

It can usefully be provided that the night mode is switched off if an activity state of a user is noticed. In this situation, the user getting up in the morning is expected. At the latest by this time a heating system should increase heating or an air conditioning system should increase cooling. Since, however, heating and/or air conditioning systems require a certain time to reach a desired reference temperature, the night mode should as far as possible already be switched off before an activity state after a state of rest is noticed. It can be provided for this that the durations of states of rest of the user are initially detected and stored as reference sleep durations of a user and/or that clock times are detected and stored as reference getting-up times, at which a change from a state of rest to an activity state of the user is noticed. In order to switch off the night mode before an activity state of the user is noticed, the night mode is switched off as a function of a ratio of a current sleep duration to the reference sleep durations and/or a ratio of the current clock time to the reference getting-up times. The reference sleep durations and/or getting-up times can in turn be stored separately for different days of the week.

The night mode can be switched off in particular as soon as only a differential duration separates the current clock time or the current duration of the state of rest from a reference getting-up time or reference sleep duration. In order to avoid an unnecessarily early switch-off of the night mode, this differential duration can also be selected as a function of a difference between a current room temperature and a reference temperature after switching off the night mode. The differential duration can accordingly be selected to be greater with increasing planned temperature change after the night mode is switched off.

Additional conditions can also be provided which must additionally be fulfilled for an activity state to be noticed, in order to switch off the night mode. A situation can thereby be avoided in which, if the user wakes up for a short time in the night and there is a short activity, the night mode is unnecessarily switched off. For this, a squelch time can be determined, in which an end of the sleep phase of the user is improbable and an noticed activity state does not lead to the night mode being switched off.

It can be provided that a duration of at least one state of rest of the user is initially detected and stored as a reference sleep duration. Alternatively or additionally, when a change to a state of rest and when a change to an activity state are noticed can be stored as a reference going-to-sleep time and as a reference getting-up time. A squelch time is then determined from a clock time of the last change between an activity state and a state of rest and also from the reference sleep duration and/or the reference going-to-sleep and reference getting-up times. A change between the activity state and the state of rest within this squelch time can thus be categorised as implausible. A switching-on or switching-off of the night mode is only permitted outside of the squelch time.

It can thereby be provided that during the squelch time a switching-on or switching-off of the night mode is still permitted if a certain frequency of activities or a predefined duration of an activity is noticed.

Since rooms to be heated or cooled are frequently occupied by two or more persons, the electronic control means can also switch on or off the night mode as a function of a state of rest or an activity state of each of multiple users. A state of rest or an activity state of each user can thereby be inferred for the different users via their respective smartphones.

It can be fixed as a precondition for switching on the night mode that the state of rest must be noticed for all participating users. It can thus be ensured that the night mode is not already switched on if one spouse has gone to sleep and the other spouse does not go to sleep until later.

The night mode can on the other hand already be switched off if, in the case of multiple users, the preconditions for switching off the night mode are present for only one of the users, for example if an activity state is noticed for only one of the users. A situation can thus be avoided in which the night mode is continued if one spouse gets up in the morning and the other spouse is still asleep.

If multiple users are considered, for the sake of energy-saving operation of the respective smartphone, the checking of an activity of the respective user may be realised only when the respective distance of all the smartphones from the heating and/or air conditioning system or from a bedroom to be temperature-controlled is shorter than a tolerance distance.

According to an embodiment of the control apparatus according to the invention this control apparatus is adapted to automatically carry out the method or one of the method variants according to the invention.

The invention also relates to an installation with a control apparatus according to the invention and with a smartphone and/or a heating and/or air conditioning system.

Further characteristics of the invention will be explained by reference to the attached drawing.

BRIEF DESCRIPTION OF THE DRAWING

FIG. 1 shows schematically an example embodiment of a control apparatus according to the invention.

DETAILED DESCRIPTION OF THE DRAWING

FIG. 1 shows schematically a control apparatus 1 according to the invention for switching on and off a night mode of a heating and/or air conditioning system 90. The heating and/or air conditioning system 90 controls the temperature, inter alia, of a bedroom of one or more persons. If the persons are asleep the heating and/or air conditioning system 90 is to be operated in a night mode with lower energy consumption.

According to the invention a switching-on and switching-off of the night mode are to be realised as a function of activities or the absence of activities of one or more persons. In the example shown, the control is carried out as a function of the activity of two persons or users who each have a smartphone 10, 11.

The control apparatus 1 comprises: program code in a non-volatile data memory 15, 16, electronic control means 30 and a setting device 80.

The setting device 80 is connected to the heating and/or air conditioning system 90 and reduces or increases its heating or cooling output if the night mode is switched on or off. In this context the term "control" is to be broadly understood and can also include closed loop control.

It is noticed using the program code when the night mode is to be switched on and off. For this, the program code is run on smartphones 10, 11 of the users and detects activities of the users.

If an activity is noticed, for example if an acceleration sensor of one of the smartphones 10, 11 detects a movement of the smartphone, the program code infers an activity state of the user.

If on the other hand no activity is noticed for a predefined time period a state of rest of the user is inferred. Apart from an acceleration sensor, further measurement or detection devices of a smartphone for ascertaining user activities are preferably used.

The program code triggers information concerning whether an activity state or a state of rest has been noticed to be sent with the smartphones 10, 11 to the control means 30. This can be realised via a WLAN and/or an internet connection.

The control means 30 are formed here by one or more computers or servers and determine, as a function of the information concerning the state of rest or activity state of the users, whether a night mode is to be switched on or off. A corresponding command is then sent by the control means 30 to the setting device 80.

Instead of the configuration illustrated, the program code can also convey the information to control means which are integrated in the smartphones, for example by software.

The control apparatus 1 can advantageously adapt the switching-on and switching-off of the night mode variably to the behaviour of the users. The night mode is generally only switched on when at least one of the users has also actually gone to bed.

The preconditions for switching on the night mode only need to be checked when the users also spend time in the area of the bedroom which is temperature-controlled by the heating and/or air conditioning system 90.

The program code thus triggers the smartphones 10, 11 to detect their positions. In addition a location indication of the heating and/or air conditioning system can be stored in the program code. The program code compares the location indication with the current position of the smartphones 10, 11. Activities are detected and/or information is forwarded to the control means 30 only if a distance from the current position of the smartphone to the stored location indication is shorter than a threshold value.

As long as the control means 30 obtain for one of the users the information that an activity state has most recently been noticed the night mode remains switched off. Only once a state of rest has been noticed for both users do the control means 30 output an instruction to change to the night mode. Ending of the night mode can be triggered by the control means 30 for example at the latest when an activity state for one of the users has been noticed once again.

In order to detect further information concerning activities of a user one or more stationary sensors 60 can also be provided. These are preferably arranged in one of the rooms to be temperature-controlled. They can for example detect an environment brightness and/or volume. In the case of increased environment brightness and/or volume an activity state of the user can be inferred. It can also be distinguished whether a user is in a bedroom or merely in an adjacent room. As an additional condition for switching on the night mode a presence of the user in the bedroom must have been detected.

In the example shown, a communication over the internet takes place initially between a smartphone 10, 11 and the control means 30 configured as a server. A communication over the internet then takes place between the control means 30 and the setting device 80 which is provided for the heating and/or air conditioning system 90. The setting device 80 ultimately controls the heating and/or air conditioning system 90 corresponding to an instruction of the control means 30. Further components for data transmission can be used between the components described.

It can be ensured with the control apparatus according to the invention and the method according to the invention that setting times of an energy-saving night mode of a heating and/or air conditioning system extensively coincide with actual sleep times of one or more users. Energy savings can thereby be achieved, whereby pleasant room temperatures are additionally set for the user (s).

The invention claimed is:

1. Method for setting a night mode of a heating and/or air conditioning system,
    reducing energy consumption of the heating and/or air conditioning system when the night mode is switched on and increasing the energy consumption of the heating and/or air conditioning system when the night mode is switched off, the method further comprising:
    detecting an activity of a user of a smartphone with the smartphone;
    inferring with program code an activity state of the user if an activity is noticed and inferring a state of rest of the user in an absence of activity, wherein the program code is stored in a non-volatile data memory;
    switching on the night mode of the heating and/or air conditioning system as a function of whether a state of rest of the user has been inferred;
    switching off the night mode of the heating and/or air conditioning system as a function of whether an activity state of the user has been inferred; and
    switching the night mode of the heating and/or air conditioning system on or off in response to detecting a switching-on of a screen on the smartphone.

2. Method according to claim 1, wherein one or more of the following checking measures are carried out to check an activity of the user:
    detect a movement of the smartphone with an acceleration sensor of the smartphone,
    detect an environment brightness with a light sensor of the smartphone or with a solar cell located on the smartphone for power generation,
    detect an environment volume with a microphone of the smartphone,
    detect an activation of a loud speaker of the smartphone,
    detect an environment temperature with a temperature sensor of the smartphone,
    detect a battery consumption of the smartphone,
    detect pressing of a key on a mechanical key or on a touch-sensitive surface of the smartphone, or
    detect an establishment or disconnection of a connection between the smartphone and a power source.

3. Method according to claim 2, wherein an activity state is inferred if at least one of the following conditions is fulfilled:
    the smartphone is moved for a time period which exceeds a predefined threshold duration,
    the environment brightness of the smartphone lies above a predefined threshold brightness for a predefined time period,
    the environment volume of the smartphone lies above a predefined threshold volume for a predefined time period, an environment temperature lies above a predefined threshold temperature, or the battery consumption lies above a threshold value within a defined time period.

4. Method according to claim 1, wherein the state of rest of the user is inferred if no activity has been noticed for a predefined time period.

5. Method according to claim 1, wherein the state of rest of the user is inferred if the smartphone is switched off and/or a certain profile setting of the smartphone is selected.

6. Method according to claim 1, wherein at least one of the following additional measures is carried out:

a room brightness is measured in a room to be temperature-controlled by the heating and/or air conditioning system, a room volume is measured in a room to be temperature-controlled by the heating and/or air conditioning system, a movement of a user is detected with a movement sensor in a room other than a bedroom, a computer use of a computer which is located in a room to be temperature-controlled by the heating and/or air conditioning system is noticed and an email or internet use of the user is noticed and the activity state is inferred, if the room brightness exceeds a predefined threshold value, in particular for a predefined time period, or if the room volume exceeds a predefined threshold value, in particular for a predefined time period, or if a movement is detected in the room other than the bedroom, in particular over at least a predefined time period, if a computer use is noticed, or if an email or internet use of the user is noticed.

7. Method according to claim 1, wherein:

durations of states of rest of the user are detected and stored as reference sleep durations and/or clock times at which a change from a state of rest to an activity state is noticed are detected and stored as reference getting-up times, to switch off the night mode before an activity state of the user is noticed the switching-off of the night mode is carried out as a function of a ratio of a current sleep duration to the reference sleep durations and/or a ratio of a current clock time to the reference getting-up times.

8. Method according to claim 1, a duration of at least one state of rest of the user is detected and stored as a reference sleep duration and/or when a change to a state of rest and when a change to an activity state are noticed are stored as a reference going-to-sleep time and as a reference getting-up time, a squelch time, within which a change between the activity state and the state of rest is categorized as implausible, is determined from a clock time of the last change between an activity state and a state of rest and also from the reference sleep duration and/or the reference going-to-sleep time and the reference getting-up time, and a switching-on or switching-off of the night mode is only permitted outside of the squelch time.

9. Method according to claim 1, wherein:

electronic control means switch on or off the night mode as a function of a respective state of rest or activity state of several users, a state of rest or an activity state of each user is inferred by means of the respective smartphone of the different users.

10. Method according to claim 1, wherein for energy saving operation of the respective smartphone an activity of the respective user is only checked when the respective distance of all smartphones from the heating and/or air conditioning system or from a bedroom to be temperature-controlled is shorter than a tolerance distance.

11. Control apparatus for switching on and off a night mode of a heating and/or air conditioning system, wherein energy consumption of the heating and/or air conditioning system is reduced when the night mode is switched on and increased when the night mode is switched off, with a setting device which can be connected to the heating and/or air conditioning system to change the heating and/or cooling output thereof, wherein a non-volatile data memory with program code is provided which can be run by a smartphone, the program code is designed, when run on the smartphone to:

detect an activity of a user of the smartphone;

infer an activity state of the user if an activity is noticed;

infer a state of rest of the user in an absence of activity;

send information concerning whether a state of rest or an activity state has been noticed to electronic control means which are designed, as a function of this information, to send an instruction to change the heating and/or cooling output to the setting device in order to switch on or off the night mode wherein the setting device has data receiver means to receive an instruction of the electronic control means; and switching the night mode of the heating and/or air conditioning system on or off in response to detecting a loud speaker at the smartphone generating acoustic signals for at least a predefined duration.

12. Method for setting a night mode of a heating and/or air conditioning system, the method comprising:

reducing energy consumption of the heating and/or air conditioning system when the night mode is switched on, and increasing the energy consumption of the heating and/or air conditioning system when the night mode is switched off;

detecting an activity of a user of a smartphone with the smartphone;

inferring with program code an activity state of the user if an activity is noticed, and inferring a state of rest of the user in an absence of the activity;

switching the night mode of the heating and/or air conditioning system on or off in response to detecting connecting or disconnecting the smartphone from a power source.

* * * * *